(12) United States Patent
Kajiki et al.

(10) Patent No.: US 6,880,018 B1
(45) Date of Patent: Apr. 12, 2005

(54) MOTION IMAGE DISTRIBUTING METHOD AND SYSTEM FOR THE SAME

(75) Inventors: Noriko Kajiki, Tokyo (JP); Satoshi Tanabe, Tokyo (JP)

(73) Assignee: Kabushiki Kaisha Office NOA, Tokyo (JP)

( * ) Notice: Subject to any disclaimer, the term of this patent is extended or adjusted under 35 U.S.C. 154(b) by 0 days.

(21) Appl. No.: 09/457,872

(22) Filed: Dec. 10, 1999

(30) Foreign Application Priority Data

Dec. 11, 1998 (JP) .......................................... 10-374942

(51) Int. Cl.⁷ .......................... G06F 15/16; H04N 7/173
(52) U.S. Cl. .......................... 709/233; 725/90; 725/94; 725/95
(58) Field of Search ................................ 709/217–219, 709/230–232, 233, 236; 703/203, 230, 231, 232, 233; 725/87, 88, 89, 90, 91, 94, 95, 100

(56) References Cited

U.S. PATENT DOCUMENTS

| | | | | |
|---|---|---|---|---|
| 5,485,213 A | * | 1/1996 | Murashita et al. | 375/240.12 |
| 5,574,752 A | * | 11/1996 | Juri | 375/354 |
| 5,774,592 A | * | 6/1998 | Takeuchi et al. | 382/236 |
| 5,819,048 A | * | 10/1998 | Okazaki et al. | 709/233 |
| 5,928,330 A | * | 7/1999 | Goetz et al. | 709/231 |
| 6,018,359 A | * | 1/2000 | Kermode et al. | 725/101 |
| 6,098,082 A | * | 8/2000 | Gibbon et al. | 715/501.1 |
| 6,334,126 B1 | * | 12/2001 | Nagatomo et al. | 707/4 |
| 6,404,901 B1 | * | 6/2002 | Itokawa | 382/103 |
| 6,424,676 B1 | * | 7/2002 | Kono et al. | 375/240.16 |
| 6,493,763 B1 | * | 12/2002 | Suzuki | 709/231 |
| 6,510,553 B1 | * | 1/2003 | Hazra | 725/87 |
| 6,535,486 B1 | * | 3/2003 | Naudus et al. | 370/235 |

OTHER PUBLICATIONS

Zhao et al, "Bandwidth–Efficient Continuous Media Streaming Through Optimal Multiplexing", In ACM SIGMETRICS (Atlanta, GA, Jun. 1999), pp. 13–22.*

Schumeyer et al, "Color–Based Content Coding with Applications to Sign Language Video Communications", Submitted to IEEE Transactions on Circuits and Systems for Video Technology, 1997.*

* cited by examiner

Primary Examiner—Marc D. Thompson
Assistant Examiner—Yemane Gerezgiher
(74) Attorney, Agent, or Firm—Rader, Fishman & Grauer PLLC

(57) ABSTRACT

A motion image distributing system having: file dividing means A for dividing a motion image file for predetermined time into a plurality of files for short time on the server side; file group classifying means B for classifying a plurality of the files divided by file dividing means A into a plurality of file groups F while presuming the degree of a communicating speed; and file group transmitting means C for transmitting file groups F, which are classified by file group classifying means B, stepwise in accordance with the discrimination for the communicating speed on the recipient side, and file group transmitting means C has communicating speed monitoring means D for monitoring the communicating speed of file groups F by itself, when loading file groups F on the recipient side, and allowing file groups F to be sequentially loaded in accordance with a margin.

8 Claims, 4 Drawing Sheets

| ① | ② | ① | ② | ① | ② | ① | ② |
|---|---|---|---|---|---|---|---|
| ③ | ④ | ③ | ④ | ③ | ④ | ③ | ④ |
| ① | ② | ① | ② | ① | ② | ① | ② |
| ③ | ④ | ③ | ④ | ③ | ④ | ③ | ④ |
| ① | ② | ① | ② | ① | ② | ① | ② |
| ③ | ④ | ③ | ④ | ③ | ④ | ③ | ④ |
| ① | ② | ① | ② | ① | ② | ① | ② |
| ③ | ④ | ③ | ④ | ③ | ④ | ③ | ④ |

FIG. 4

MOTION IMAGE DISTRIBUTING METHOD AND SYSTEM FOR THE SAME

BACKGROUND OF THE INVENTION

1. Field of the Invention

The present invention generally relates to motion image distribution though the Internet communication or the like by a personal computer, more particularly, to a motion image distributing method and a system for the same by which tolerance is increased to the variation of communicating speed.

2. Description of the Related Art

Hitherto, stream distribution via the Internet is executed, based on a so-called HTTP (HyperText Transfer Protocol) serving as a protocol used for a WWW server for receiving and transmitting a HyperText. Normally, the motion image stream distribution needs a specific motion image server for setting a plurality of motion image files every communicating speed.

However, according to the related art, in case of distributing motion image data through a line such as the Internet for which effective communicating speed is not guaranteed, the motion image might be interrupted without taking the data distribution into specific account. Therefore, long buffering term is necessary to prevent the above-stated interrupting state.

In case of staring communication on the assumption that the speed is largely lower than protocol communicating speed based on an HTTP (HyperText Transfer protocol) serving as a used line, even though the effective communicating speed could be recovered to an original speed, the interrupting state would be maintained in the present circumstances.

The conventional motion image data distribution has a problem such that a plurality of motion image files are needed every communicating speed, so that this makes a file capacity on the sender side increasing.

SUMMARY OF THE INVENTION

To solve the above-mentioned conventional problems, it is an object of the present invention to provide a motion image distributing method and a system for the same wherein, in case of motion image data stream distribution through the Internet, tolerance is raised to the variation of the communicating speed so that it is possible to avoid the interrupting state of the motion image via a communicating line, prevent the file capacity on the sender side from being increased, and distribute a motion image stream by a normal HTTP server, without needing a specific motion image server.

To solve the above-stated problems, according to the present invention, there is provided a motion image distributing method in motion image stream distribution through the Internet communication or the like for transmitting a motion image file to a recipient side from a server side by loading on the recipient side on the basis of a prescribed protocol, comprising the steps of: dividing a motion image file for predetermined time into a plurality of files for short time on the server side; classifying the divided files into a plurality of file groups F while presuming the degree of a communicating speed; and transmitting the file groups F stepwise in accordance with the discrimination for the communicating speed on the recipient side.

To solve the above-stated problems, according to the present invention, there is also provided the motion image distributing method in the motion image stream distribution through the Internet communication or the like for transmitting the motion image file to the recipient side from the server side by loading on the recipient side on the basis of the prescribed protocol, wherein fine divided files exist in a frame in which the files are divided, further comprising the step of allowing variation in effective line speed to first correspond to variation in image quality based on discriminating which of the fine divided files are required; and, only in the case of where the correspondence is impossible, allowing the variation in the effective line speed to correspond to variation in frame rate based on discriminating which of a plurality of the file groups F are required.

Further, to solve the above-stated problems, according to the present invention, there is provided a motion image distributing system in motion image stream distribution through the Internet communication or the like for transmitting a motion image file to a recipient side from a server side by loading on the recipient side on the basis of a prescribed protocol, comprising: file dividing means A for dividing a motion image file for predetermined time into a plurality of files for short time on the server side; file group classifying means B for classifying the files divided by the file dividing means A into a plurality of file groups F while presuming the degree of a communicating speed; and file group transmitting means C for transmitting the file groups F, which are classified by the file group classifying means B, stepwise in accordance with the discrimination for the communicating speed on the recipient side.

To solve the above-stated problems, according to the present invention, there is provided the motion image distributing system in the motion image stream distribution through the Internet communication or the like for transmitting the motion image file to the recipient side from the server side by loading on the recipient side on the basis of a prescribed protocol, further comprising: file fine dividing means for further fine dividing an intra-frame which is divided into files by the file dividing means A; and corresponding means for allowing variation in effective line speed to first correspond to variation in image quality based on discriminating which of the fine divided files are required and, only in the case of where the correspondence is impossible, allowing the variation in the effective line speed to correspond to variation in frame rate based on discriminating which of a plurality of the file groups F are required.

In addition, to solve the above-stated problems, according to the present invention, there is provided the motion image distributing system for the same in the motion image stream distribution through the Internet communication or the like for transmitting the motion image file to the recipient side from the server side by loading on the recipient side on the basis of a prescribed protocol, further comprising communicating speed monitoring means D for monitoring the communicating speed of the file groups F by itself, when loading the file groups F on the recipient side, and allowing the file groups F to be sequentially loaded in accordance with a margin.

According to the present invention, there is provided the motion image distributing method and system for the same, wherein the file group transmitting means C for transmitting the file groups F, which are classified by the file group classifying means B, stepwise in accordance with the discrimination for the communicating speed on the recipient side makes tolerance to variation in communicating speed of the file groups F wider than that in accordance with the conventional art, the file capacity on the server side is allowed to the minimum requirement, and only a process for setting the divided data group to an HTTP server enables the distribution of the motion image, and the communicating speed monitoring means D discriminates whether there is a margin or not by monitoring the communicating speed of the file groups F by itself and, in the case where there is a margin, the file groups F are sequentially started to be loaded.

The variation in effective line speed is allowed to correspond to variation in image quality based on by discriminating which of the fine divided files are required and, only in the case of where the correspondence is impossible, the variation in the effective line speed is allowed to correspond to variation in frame rate based on discriminating which of a plurality of files F are required.

BRIEF DESCRIPTION OF THE DRAWINGS

FIG. 4 is an illustrative view of image division in one frame of the embodiment according to the present invention.

DESCRIPTION OF THE PREFERRED EMBODIMENT

An embodiment of the present invention will be now described with reference to the drawings. The motion image distributing system according to this embodiment comprises: file dividing means A for dividing a motion image file for predetermined time into a plurality of files for short time on the server side, as exemplified that frame numbers are divided into a plurality of files during 1 sec as shown in FIGS. 1 to 4; file group classifying (forming) means B for compressing the divided files by the file dividing means A, respectively, classifying (forming) the compressed files into a plurality of file groups F, as exemplified that frame numbers 1, 4, and 7 are classified to a first group, frame numbers 2, 5, and 8 a second group, and frame numbers 3, 6, and 9 a third group, and the like, and storing the classified groups to directories, while presuming the degree of a communicating speed (referred to as FIGS. 2 and 3); and file group transmitting means C for stream-transmitting the file groups F, which are classified by the file group classifying (forming) means B, stepwise and time-sequentially, based on a moving average of the communicating speed on the recipient side. The file group transmitting means C also has communicating speed monitoring means D for monitoring the communicating speed of the file groups F by itself, when loading the file groups F on the recipient side, and allowing the file groups F to be sequentially loaded in accordance with a margin (referred to as FIG. 1).

Figure 3:
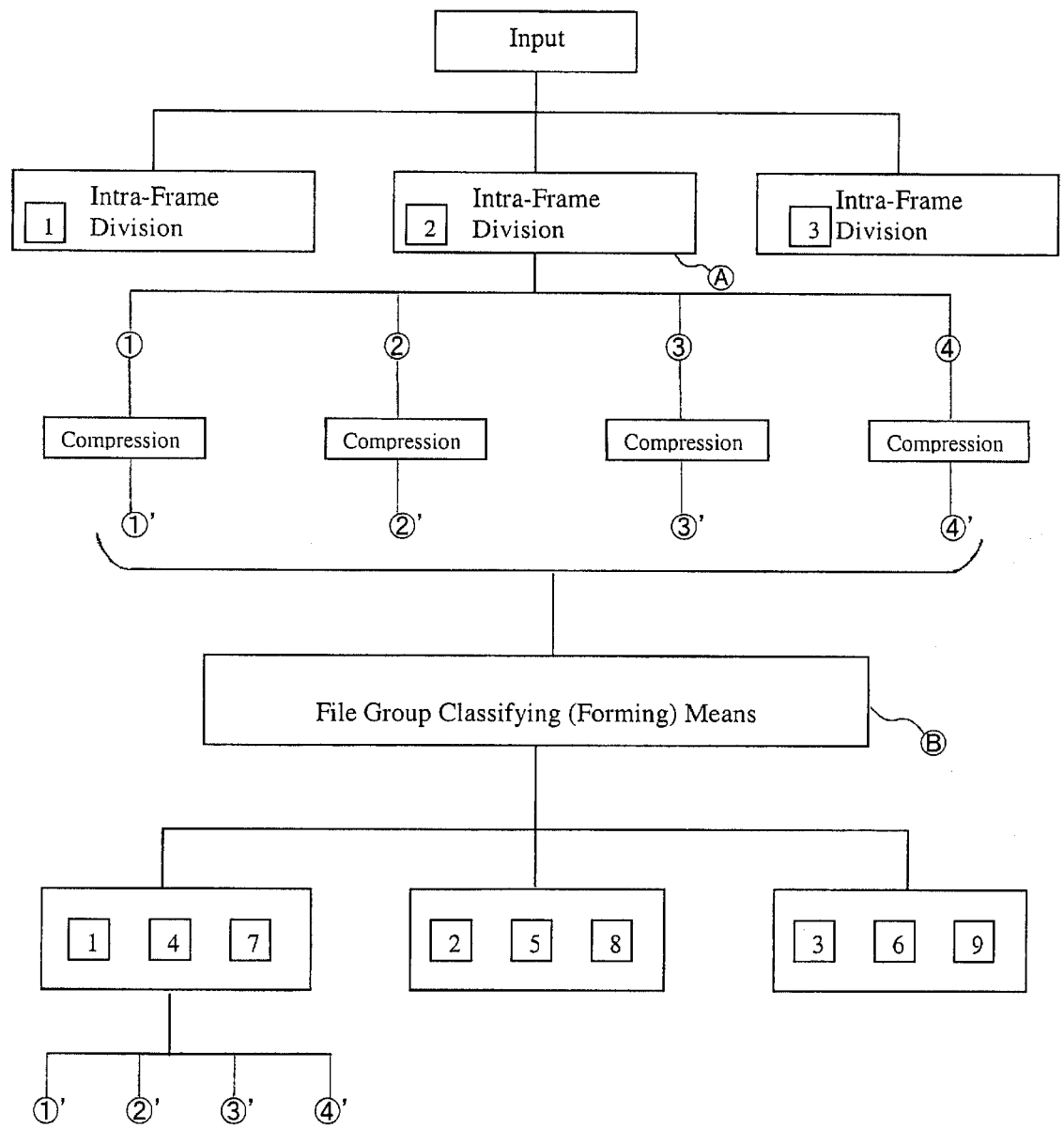
FIG. 3 is an illustrative view of file group classifying (forming) means of the embodiment according to the present invention.

In addition, as shown in FIG. 3, the file group classifying (forming) means B has: file fine dividing means for allowing the classified frame numbers in each group to be further fine divided, file names are given in accordance with necessity, and the fine divided numbers to be stored to directories; and corresponding means for allowing variation in effective line speed to first correspond to variation in image quality based on discriminating which of the fine divided files are required and, only in the case where the correspondence is impossible, allowing the variation in the effective line speed to correspond to variation in frame rate based on discriminating which of a plurality of files F are required. As shown in FIG. 4, the image division in one frame is performed in a manner such that four fine-divided files are formed and the correlations (differences) are calculated, that is, differences between a file 1 corresponding to a frame just before and the file 1; a file 2 and the file 1 in the self-frame; a file 3 and the file 1 in the self-frame; and a file 4 and the file 1 in the self-frame. The file group classifying (forming) means B is uploaded and stored to the server side. On the contrary, the user side requests of the server side, necessary motion image information (file), and the server side transmits only the requested information to the user side, thereby reducing the load on the server side. As explained above, a part of the load on the server side is taken to the user side and the load is distributed. Accordingly, it is possible to correspond to even the low capacity on the server side.

Figure 1:
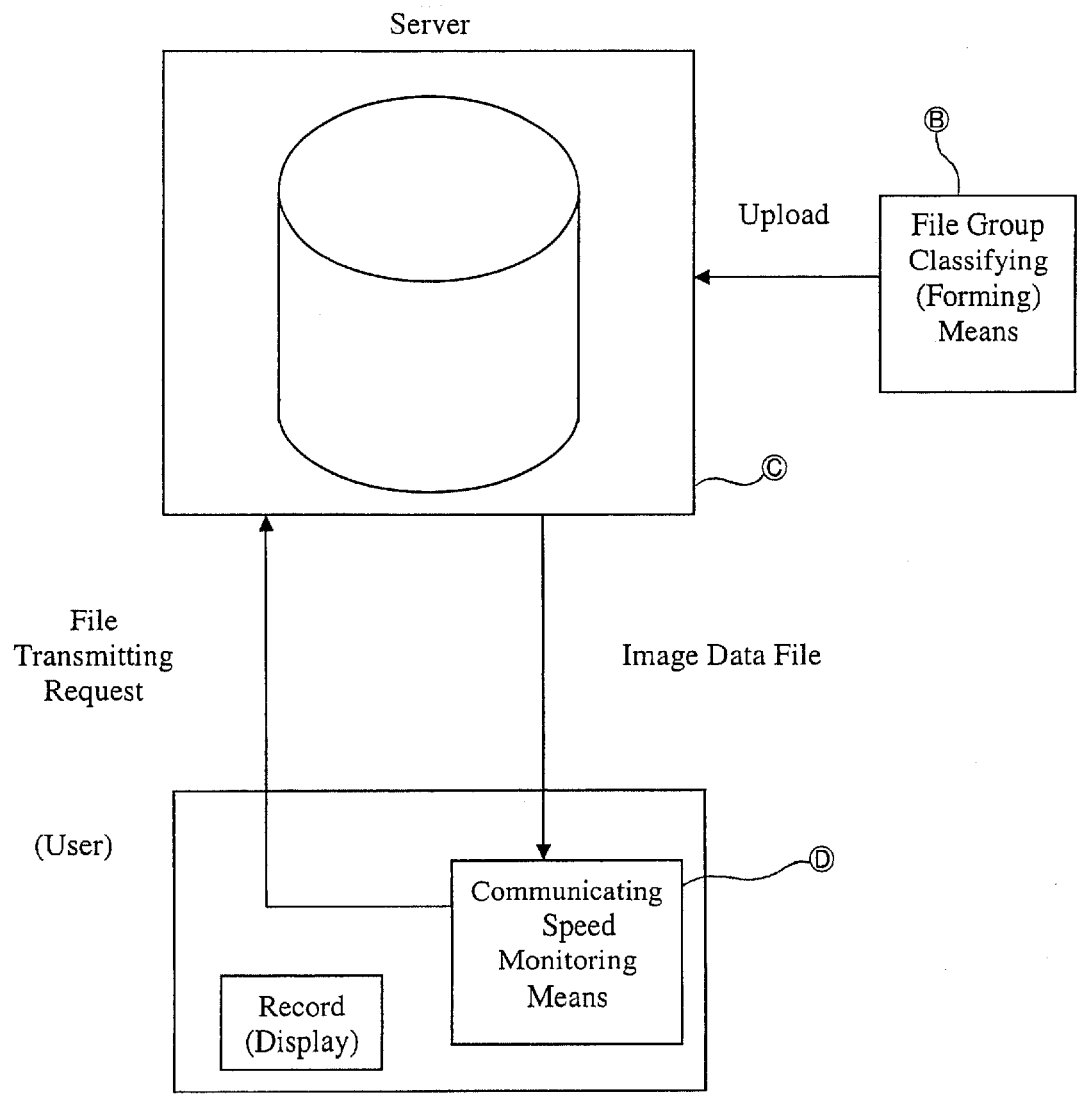
FIG. 1 is a block diagram of a construction showing an embodiment according to the present invention.
Figure 2:
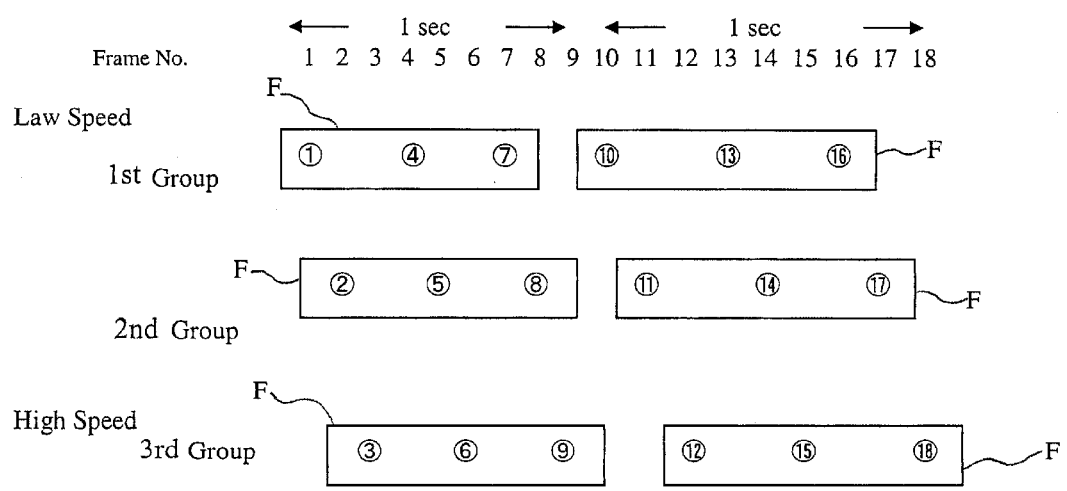
FIG. 2 is an illustrative view of file division of the embodiment according to the present invention.

According to this embodiment, there is provided a motion image distributing method in motion image stream distribution through the Internet communication or the like for transmitting a motion image file to a recipient side from a server side by loading on the recipient side on the basis of a prescribed protocol, as shown in FIG. 1, comprising the steps of: dividing a motion image file for predetermined time into a plurality of files for short time on the server side; classifying the divided files into a plurality of file groups F while presuming the degree of a communicating speed; and transmitting the file groups F stepwise in accordance with discrimination for the communicating speed on the recipient side. Specifically speaking, as shown in FIG. 2, the file dividing means A divides a motion image file for predetermined time to files on nine-frame-number unit basis every second, such as frame numbers 1 to 9, and 10 to 18. The file group classifying means B classifies the divided files into a plurality of file groups F, e.g. first groups (corresponding to a low communication-speed) such as the frame numbers (1, 4, and 7), (10, 13, and 16), second groups (corresponding to a low communicating-speed) such as the frame numbers (2, 5, and 8), and (11, 14, and 17), and third groups (corresponding to a high communicating-speed) such as the frame numbers (3, 6, and 9), and (12, 15, and 18). In case of dividing the motion image file for long time into a plurality of files for short time on the server side, the communicating speed having some stages is taken into account, the motion image file is divided into the file groups F, and the files F are transmitted stepwise and time-sequentially in accordance with the moving average of the communicating speed on the recipient side.

The recipient side first starts to load the first groups and allows the communicating speed monitoring means D to monitor the communicating speed of the file groups F by itself, thereby allowing the communicating speed monitoring means D to discriminate whether there is a margin or not and, if there is a margin, also starting to load the second groups. At this time, the highest speed is obtained in the case where the margin is large and it is capable of loading the file groups up to the third groups. The communicating speed monitoring means D is set to load the file groups up to the second groups, abandoning the third groups when decrease in communicating speed of the file groups F which are monitored in a state where the file groups up to the third groups have been loaded. As mentioned above, it is set in a manner to make the tolerance to variation in communication speed of the file groups F wider as compared with that of the conventional art.

The present invention is constructed in the above-explained manner. In particular, in the motion image data stream distribution through the Internet, the tolerance to the variation in communicating speed can be increased so that it is possible to avoid the interrupting state of the motion image via a communicating line, prevent the increase in file capacity on the sender side, and stream-distribute a motion image by a normal HTTP server, without needing a specific motion image server.

Since it is unnecessary to have a plurality of files every communicating speed on the server side, the file capacity for transmission on the server is allowed to the minimum requirement, and also only a process for setting the divided data group to a normal HTTP server enables the stream distribution of the motion image.

The contents of Japanese patent application No. 10-374942 filed Dec. 11, 1998 are incorporated by reference in their entirety.

What is claimed is:

1. A motion image distributing method for transmitting a motion image file from a server side to a recipient side, the method comprising the steps of:

dividing said motion image file into a plurality of files;

classifying said divided plurality of files into a plurality of file groups, a first group of said plurality of file groups being a first subset of said divided plurality of files, a second group of said plurality of file groups being a second subset of said divided plurality of files, and a third group of said plurality of file groups being a third subset of said divided plurality of files; and transmitting said first, second and third groups from said server side to said recipient side, said recipient side being adapted to receive said first, second and third groups, said recipient side abandoning receipt of said third group upon a decrease in communicating speed between the said server side and said recipient side.

2. A method according to claim 1, wherein fine divided files exist in a frame in which said files are divided, and further comprising the step of:

allowing variation in effective line speed to first correspond to variation in image quality based on discriminating which of said fine divided files are required and, only in the case of where the correspondence is impossible, allowing the variation in the effective line speed to correspond to variation in frame rate based on discriminating which of a plurality of said file group are required.

3. A motion image distributing system for transmitting a motion image file from a server side to a recipient side, the system comprising:

file dividing means; file group classifying means; and file group transmitting means, wherein:

said file dividing means divides said motion image file into a plurality of files;

said file group classifying means classifies said divided plurality of files into a plurality of file groups, a first group of said plurality of file groups being a first subset of said divided plurality of files, a second group of said plurality of file groups being a second subset of said divided plurality of files, and a third group of said plurality of file groups being a third subset of said divided plurality of files; and said file group transmitting means transmits said first, second and third groups from said server side to said recipient side, said recipient side being adapted to receive said first, second and third groups, said recipient side abandoning receipt of said third group upon a decrease in communicating speed between the said server side and said recipient side.

4. A system according to claim 3, further comprising:

communicating speed monitoring means, said communicating speed monitors the communicating speed of said first, second and third groups by itself, when loading the file groups on the recipient side, and allowing the file groups to be sequentially loaded in accordance with a margin.

5. A system according to claim 3, further comprising:

file fine dividing means and corresponding means, wherein:

said file fine dividing means further fine divides an intra-frame which is divided into files by said file dividing means; and said corresponding means allows variation in effective line speed to first correspond to variation in image quality such based on discriminating which of said fine divided files are required and, only in the case of where the correspondence is impossible, allowing the variation in the effective line speed to correspond to variation in frame rate based on discriminating which of a plurality of said file groups are required.

6. A system according to claim 5, further comprising:

communicating speed monitoring means, said communicating speed monitors the communicating speed of said first, second and third groups by itself, when loading the file groups on the recipient side, and allowing the file groups to be sequentially loaded in accordance with a margin.

7. A system according to claim 3, wherein said file group classifying means compresses said divided plurality of files into said plurality of file groups.

8. A system according to claim 3, wherein said file group transmitting means stream-transmits said plurality of file groups from said server side to said recipient side.

* * * * *